(12) United States Patent
Salhi et al.

(10) Patent No.: US 12,044,566 B2
(45) Date of Patent: Jul. 23, 2024

(54) MEASURING DEVICE COMPRISING A CONNECTING OPTICAL FIBRE AND A MEASURING EQUIPMENT FOR INSTRUMENTATION OF AN AERONAUTICAL SYSTEM, AND AN AERONAUTICAL SYSTEM COMPRISING SUCH A MEASURING DEVICE

(71) Applicant: SAFRAN, Paris (FR)

(72) Inventors: Nassim Salhi, Moissy-Cramayel (FR); Minh Chau Phan Huy, Moissy-Cramayel (FR); Ioannis Stasinopoulos, Moissy-Cramayel (FR)

(73) Assignee: SAFRAN, Paris (FR)

( * ) Notice: Subject to any disclaimer, the term of this patent is extended or adjusted under 35 U.S.C. 154(b) by 220 days.

(21) Appl. No.: 17/630,806

(22) PCT Filed: Jul. 27, 2020

(86) PCT No.: PCT/FR2020/051370
§ 371 (c)(1),
(2) Date: Jan. 27, 2022

(87) PCT Pub. No.: WO2021/019173
PCT Pub. Date: Feb. 4, 2021

(65) Prior Publication Data
US 2022/0357196 A1 Nov. 10, 2022

(30) Foreign Application Priority Data

Jul. 29, 2019 (FR) ........................................ 1908621

(51) Int. Cl.
*G01H 9/00* (2006.01)
(52) U.S. Cl.
CPC .................................. *G01H 9/004* (2013.01)

(58) Field of Classification Search
CPC ........ G01H 9/004; G01H 9/006; G01H 9/008; G01H 9/002; G01H 11/00; G01H 13/00;
(Continued)

(56) References Cited

U.S. PATENT DOCUMENTS 4,959,539 A * 9/1990 Hofler .................... G10K 13/00
250/227.19
7,282,697 B2 * 10/2007 Thomas ................. G01H 9/004
73/514.01
(Continued)

FOREIGN PATENT DOCUMENTS

DE 10 2016 202 662 A1 9/2017
DE 102016202662 A1 * 9/2017 ......... G01K 11/3206

OTHER PUBLICATIONS

International Search Report mailed on Nov. 6, 2020 in PCT/FR2020/051370 filed on Jul. 27, 2020 (2 pages).
(Continued)

*Primary Examiner* — Daniel L Murphy
*Assistant Examiner* — Amie M Ndure
(74) *Attorney, Agent, or Firm* — Oblon, McClelland, Maier & Neustadt, L.L.P.

(57) ABSTRACT

A measuring device including a measuring equipment that is configured to be optically interrogated by a measuring instrument with first optical signals in a first wavelength range, and a connecting optical fibre for optically connecting a measuring equipment to a measuring instrument. The connecting optical fibre includes at least a first optical core that is multimode in the first wavelength range and a second optical core that is single-mode in a second wavelength range. The connecting optical fibre includes at least one first segment of functionalised optical fibre that is such as to exhibit, at the second wavelength, and optical property that varies with an environmental parameter of the connecting optical fibre. The invention also relates to a measuring
(Continued)

assembly and to an apparatus that includes such a measuring assembly.

16 Claims, 9 Drawing Sheets

(58) Field of Classification Search
  CPC ........ G01H 11/06; G01H 11/08; G01H 15/00;
    G01H 17/00; G01H 1/04; G01H 1/06;
    G01H 3/04; G01H 3/08; G01V
    2210/6163; G01V 1/247; G01V 1/001;
    G01V 1/20; G01V 1/22; G01V 1/223;
    G01V 1/226; G01V 1/24; G01V 1/28;
    G01V 1/284; G01V 1/30; G01V 1/303;
    G01V 1/305; G01V 1/307; G01V 1/32;
    G01V 1/325
  USPC ........................................................ 367/149
  See application file for complete search history.

(56) References Cited

U.S. PATENT DOCUMENTS

| | | | | |
|---|---|---|---|---|
| 10,746,208 | B2* | 8/2020 | Logan | G01M 11/085 |
| 2003/0112443 | A1* | 6/2003 | Hjelme | G01N 21/7703 |
| | | | | 356/480 |
| 2006/0227330 | A1* | 10/2006 | Hjelme | G01N 21/7703 |
| | | | | 356/481 |
| 2008/0226217 | A1* | 9/2008 | Kilic | G01H 9/004 |
| | | | | 385/12 |
| 2009/0320609 | A1* | 12/2009 | Xia | G01L 3/12 |
| | | | | 73/862.08 |
| 2011/0135246 | A1* | 6/2011 | Homa | G01K 11/3206 |
| | | | | 385/12 |
| 2011/0167916 | A1* | 7/2011 | Miki | G01H 9/004 |
| | | | | 73/655 |
| 2012/0127459 | A1 | 5/2012 | Handerek | |
| 2013/0301037 | A1* | 11/2013 | Handerek | G01V 1/40 |
| | | | | 356/73.1 |
| 2018/0073916 | A1* | 3/2018 | Launay | G01D 5/264 |
| 2018/0259551 | A1* | 9/2018 | Villnow | G01P 15/093 |
| 2018/0284737 | A1* | 10/2018 | Cella | G05B 19/41875 |
| 2019/0033205 | A1* | 1/2019 | Egalon | G01D 5/35345 |
| 2020/0103894 | A1* | 4/2020 | Cella | G05B 23/0264 |
| 2020/0319019 | A1* | 10/2020 | Westerveld | G01H 9/004 |

OTHER PUBLICATIONS

Preliminary French Search Report dated on Apr. 15, 2020 in FR1908621 filed on Jul. 29, 2019 (2 pages).

* cited by examiner

MEASURING DEVICE COMPRISING A CONNECTING OPTICAL FIBRE AND A MEASURING EQUIPMENT FOR INSTRUMENTATION OF AN AERONAUTICAL SYSTEM, AND AN AERONAUTICAL SYSTEM COMPRISING SUCH A MEASURING DEVICE

TECHNICAL FIELD

The invention relates to the field of measuring equipments and their optical connection to optical measurement systems.

The object of the invention is thus more particularly a measuring device, a measurement assembly and an aeronautical system comprising such a measuring device.

PRIOR ART

In order to obtain the measurement of a parameter of an apparatus or of a vehicle, such as, for example, the acoustic vibrations to which said apparatus or vehicle is subjected, it is sometimes necessary to install therein measuring equipments, or sensors, such as acoustic vibration measuring equipments, and corresponding measurement systems allowing to interrogate said measuring equipments to determine said parameter. This communication, when optical, is generally achieved by means of an optical fibre.

Mention may be made of the example provided by the document FR 3 026 838 relating to the measurement of acoustic vibrations by means of an opto-mechanical transducer and which can be interrogated by an optical measurement system by means of a connection provided by an optical fibre.

However, if such equipments allow to measure one or more parameters of said apparatus or vehicle, the measurements that they provide are not always complete and may be dependent on other parameters, such as the temperature of the equipment to which the equipment does not give access.

Thus, it could be interesting to be able to supplement the measurement(s) provided by such equipment without requiring the addition of a new equipment which, in addition to making the apparatus or the vehicle heavier, should then be integrated into said apparatus or vehicle.

DESCRIPTION OF THE INVENTION

The invention aims at solving the above problem and thus aims at providing a solution allowing to supplement the measurements provided by aa a measuring equipment optically connected to a measurement system without requiring an additional item of measuring equipment and without disturbing the communication between said item of equipment and the optical system.

The invention relates for this purpose to a measuring device comprising:
  a measuring equipment configured to be interrogated optically by a measurement system by means of first optical signals in a first wavelength range,
  a connecting optical fibre comprising a first end connected to the measuring equipment and a second end intended to be connected to the measurement system, the connecting optical fibre comprising at least a first multi-mode optical core in the first wavelength range for transmitting the first optical signals.
The connecting optical fibre further comprises a second single-mode optical core in a second wavelength range, the connecting optical fibre comprising at least a first functionalised optical fibre portion adapted to have at the second wavelength range an optical feature varying with an environmental parameter of the connecting optical fibre,
  and the measuring device further comprising a coupling system associated with the second end of the connecting optical fibre, the coupling system comprising at least a first and a second optical output and being adapted to optically couple the first optical core with the first output and to optically couple the second optical core with the second output.

Thus, it is possible, without having to add an additional item of measuring equipment, to obtain, by measuring the optical feature by means of a second optical signal in the second wavelength range, a measurement of an environmental parameter of the optical fibre and therefore of the measuring equipment. In addition, this measurement is carried out with a reduced disturbance since the first and the second optical signals are confined in the first and the second optical core respectively. It will also be noted that with such a configuration, it is possible to combine two types of measurement, one relating to the measurements provided by the measuring equipment, based on an interrogation by means of a multi-mode optical fibre, and the other, relating to the measurements obtained by means of the functionalised optical fibre portion, based on an interrogation by means of a single-mode optical fibre.

By "functionalised portion" it should be understood above and in the remainder of this document that the first optical fibre portion has a structural modification relative to the rest of the non-functionalised optical fibre providing sensitivity to an environmental parameter. Such a structural modification of the optical fibre can be related, for example, to the composition of this portion or of one of the elements of this portion, such as the second optical core, the addition of a coating, the inscription of a structure, such as a Bragg grating, or a combination of two or more of these possibilities.

According to an advantageous possibility of the invention, the first optical fibre may further comprise a second functionalised fibre portion, said second functionalised fibre portion being adapted to have at the second wavelength range an optical feature varying with an environmental parameter of the connecting optical fibre identical or different from that of the first functionalised optical fibre portion.

According to this possibility, the second wavelength range may include a first and second sub-range of joined or split wavelengths, the functionalised fibre portion being adapted to have at the first wavelength sub-range the optical feature varying with said environmental parameter of the connecting optical fibre, the second functionalised fibre portion being adapted to have, at the second wavelength sub-range, the optical feature varying with the environmental parameter of the connecting optical fibre identical to or different from that of the first functionalised optical fibre portion.

According to one possibility of the invention, the functionalisation of the first functionalised fibre portion can be adapted to limit the leakage of the second optical signals towards the first optical body.

In this way, the confinement of the second optical core being preserved over the entire length of the connecting optical fibre, the splitting between the first and the second signals is almost total and it is therefore not necessary to filter the possible part of the second signals which could have diffused in the first optical core during the interaction between the second optical signals and the first functionalised fibre portion.

The coupling system may further be configured, at the first output, to at least partially filter the second optical signals guided through the first optical core.

Such a coupling system allows to limit, or even eliminate, the part of the second optical signals which could possibly have diffused with the first optical signals and thus limit the risks of disturbance during the analysis of the second optical signals by the optical measurement system.

The coupling system may further be configured, at the second output, to at least partially filter the first optical signals guided through the second optical core.

The second end of the connecting optical fibre can comprise the coupling system,
  the coupling system comprising a first optical fibre segment optically coupled to the first optical core and optically decoupled from the second optical core, and a second optical fibre segment optically coupled to the second optical core and optically decoupled from the first optical core,
  the first optical fibre segment comprising the first optical output,
  the second optical fibre segment comprising the second optical output, the coupling system preferably being a double-clad coupler.

Such a coupling system allows to provide a particularly compact coupling system since it is included in the optical fibre.

Note, moreover, that in a double-clad coupler configuration, such as that described in document U.S. Pat. No. 8,792,757, it is possible to obtain an optical coupling of the first optical core with only the first optical output and an optical coupling of the optical core with the second optical output. Thus, an efficient splitting is obtained between the first and the second optical signals. The coupling system can be external to the second optical fibre, such as a splitter capable of splitting the first optical signals and the second optical signals to direct them respectively to the first and the second optical output.

Thus, it is possible to better control the splitting between the first and second optical signals while ensuring a connection between the connecting optical fibre and the measurement system by means of suitable connectors, since obtained through the coupling system.

The first functionalised optical fibre portion can comprise a Bragg grating inscribed in the second optical core.

Such a functionalisation of the connecting optical fibre allows to go back to environmental parameters of the connecting optical fibre, such as the temperature and the stresses exerted on the latter.

The measuring equipment may be a vibration detection system, such as a membrane vibration detection system.

Such a vibration detection system allows to measure the vibrations to which the equipment on which the measuring device is installed is subjected, from simple optical signals.

The invention further relates to a set of measurements comprising:
  a measuring device according to the invention,
  an optical measurement system configured to interrogate the measuring equipment by means of first optical signals in the first wavelength range and to measure the optical feature of the first optical fibre portion functionalised by means of second optical signals in the second wavelength range, the optical measurement system being connected to the first and to the second optical output of the coupling system.

Such a measurement assembly has the advantages inherent in the measuring device according to the invention.

The optical measurement system can comprise:
  a first optical source adapted to emit optical signals in the first wavelength range,
  a first optical signal analyser adapted to analyse the first optical signals from the interrogation of the measuring equipment,
  a second optical source adapted to emit optical signals in the second wavelength range,
  a second optical signal analyser adapted to analyse the second optical signals in order to determine the optical feature of the first functionalised optical fibre portion,
  a first connection element adapted to connect the first optical source and the first optical signal analyser to the first output of the coupling system,
  a second connection element adapted to connect the second optical source and the second optical signal analyser to the second output of the coupling system.

With such a configuration, it is possible to separately optimise the optical signals used to interrogate the measuring equipment and those used to interrogate the functionalisation of the functionalised optical fibre portion.

The optical measurement system can comprise:
  a first optical source adapted to emit optical signals in the first wavelength range,
  a second optical source adapted to emit optical signals in the second wavelength range,
  an optical signal analyser adapted to analyse the first optical signals resulting from the interrogation of the measuring equipment and to analyse the second optical signals after interaction with the first functionalised optical fibre portion in order to determine the optical feature of the first functionalised optical fibre portion and the corresponding environmental parameter of the connecting optical fibre,
  a first connection element adapted to connect the first optical source and the optical signal analyser to the first output of the coupling system,
  a second connection element adapted to connect the second optical source and the optical signal analyser to the second output of the coupling system.

In this way, it is possible to provide a simplified and light measurement system, since it only requires a single optical signal analyser while being able to separately optimise the first and second optical signals, since their emission is obtained by means of distinct optical sources.

The optical measurement system can comprise:
  an optical source adapted to emit optical signals in the first wavelength range and in the second wavelength range,
  a first optical signal analyser adapted to analyse the first optical signals from the interrogation of the measuring equipment,
  a second optical signal analyser adapted to analyse the second optical signals after interaction with the first functionalised optical fibre portion in order to determine the optical feature of the first functionalised optical fibre portion and the environmental parameter of the corresponding connecting optical fibre,
  a first connection element adapted to connect the optical source and the first optical signal analyser to the first output of the coupling system,
  a second connection element adapted to connect the optical source and the second optical signal analyser to the second output of the coupling system.

With such a configuration, it is possible to provide a simplified and light measurement system, since a single light source is used to generate the first and second optical signals.

The optical measurement system comprises:
- an optical source adapted to emit optical signals in the first wavelength range and in the second wavelength range,
- an optical signal analyser adapted to analyse the first optical signals resulting from the interrogation of the measuring equipment and to analyse the second optical signals after interaction with the first functionalised optical fibre portion in order to determine the optical feature of the first functionalised optical fibre portion and the corresponding environmental parameter of the connecting optical fibre,
- a first connection element adapted to connect the optical source and the first optical signal analyser to the first output of the coupling system,
- a second connection element adapted to connect the optical source and the second optical signal analyser to the second output of the coupling system.

With such a configuration, it is possible to provide a particularly simplified and light measurement system, since a single light source and a single optical signal analyser are used to make the measurements according to the invention.

The measuring device is a device according to the invention wherein the first functionalised optical fibre portion comprises a Bragg grating inscribed in the second optical core, the optical measurement system being able to be configured to measure a variation in the resonance frequency of the Bragg grating from optical signals in the second wavelength range.

The invention further relates to a measurement method from a measuring device according to the invention, comprising the following steps:
- emitting first optical signals in the first wavelength range, said first optical signals being transmitted to the first optical output of the coupling system and the first optical core in order to interrogate the measuring equipment,
- analysing the first optical signals recovered from the first optical output of the coupling system after interaction with the measuring equipment,
- emitting second optical signals in the second wavelength range, the second optical signals being transmitted to the second optical output of the coupling system and the second optical core in order to interact with the first functionalised optical fibre portion,
- analysing the second optical signals recovered from the second optical output of the coupling system after interaction with the first functionalised optical fibre portion in order to determine the optical feature of the first functionalised optical fibre portion and the environmental parameter of the corresponding connecting optical fibre.

Such a method allows to benefit from the advantages inherent in the use of a measuring device according to the invention.

The invention further relates to an apparatus comprising a measurement assembly according to the invention.

Such a turbomachine apparatus benefits from the advantages associated with a measurement assembly according to the invention.

The system may be a turbomachine.

A turbomachine particularly benefits from the possibilities of the invention since the measurement assembly according to the invention provides access, without adding a separate sensor to the assembly, to another parameter of the turbomachine. Thus, it is possible to improve the monitoring of the turbomachine without significantly increasing the turbomachine.

BRIEF DESCRIPTION OF THE DRAWINGS

The present invention will be better understood upon reading the description of exemplary embodiments, given purely in an indicative and non-limiting manner, with reference to the appended drawings wherein.

Identical, similar or equivalent parts of the different figures bear the same reference numerals so as to facilitate the passage from one figure to another.

The different parts shown in the figures are not necessarily on a uniform scale, to make the figures more readable.

The different possibilities (variants and embodiments) should be understood as not being mutually exclusive and can be combined with each other.

DESCRIPTION OF EMBODIMENTS

Figure 1:
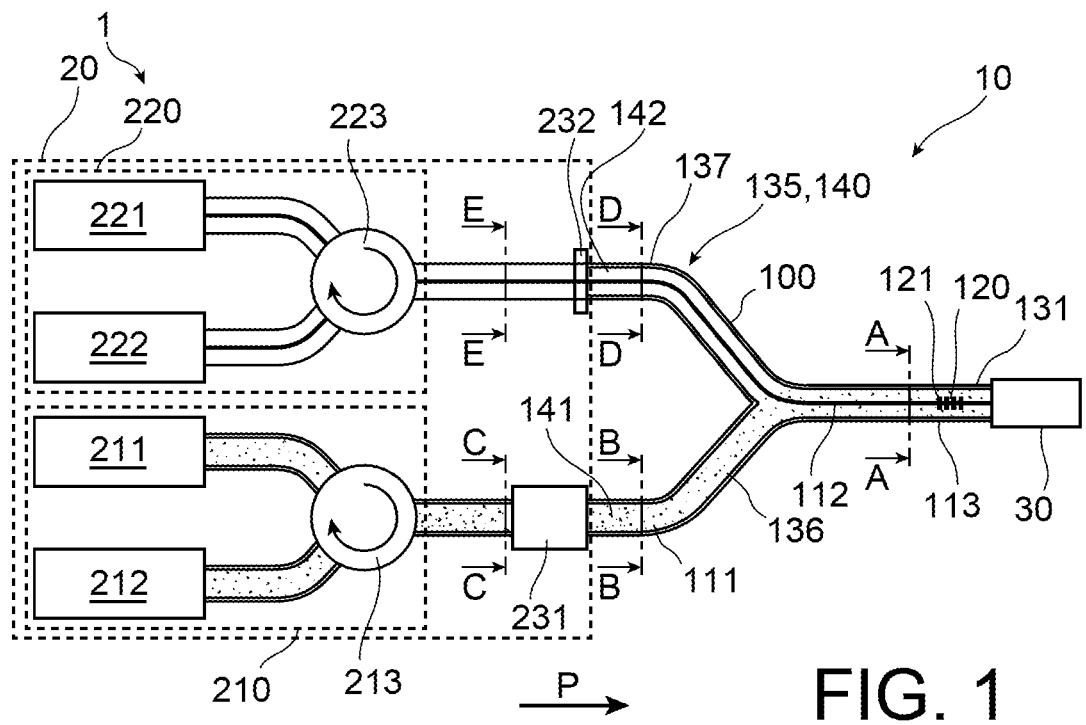
FIG. 1 illustrates a measurement assembly according to a first embodiment of the invention, said measurement assembly comprising a measuring device according to the invention.

The object of the invention, as shown in FIG. 1, is a measurement assembly 1 comprising a measurement system 20 and a measuring equipment 30 connected to each other by a connecting optical fibre 100, the measuring equipment 30 and the connecting optical fibre 100 together forming a measuring device 10.

More specifically and according to an example of preferred application of the invention, in the present embodiment, the measurement assembly 1 is an acoustic vibration measurement assembly for measuring the acoustic vibrations of a turbomachine, which is not illustrated. The measurement assembly 1 thus includes, as item of measuring equipment, an optical acoustic vibration sensor similar to the acoustic sensor marketed by the company Phonoptics™ and the connecting optical fibre 100 includes an inscribed Bragg grating. Of course, this exemplary embodiment given in the context of this first embodiment is provided for illustrative purposes only and is in no way limiting. Indeed, the person skilled in the art being able to extrapolate the teaching of the present application to another type of item of measuring equipment capable of communicating with a measurement system by optical signals and to another type of functionalisation of the connecting optical fibre 100 as emerges from the present description. Likewise, the measuring device according to the invention is not limited to the equipment of turbomachines only and also aims at other types of systems, such as, for example, landing gears or else fuselage parts of this same turbomachine.

It will thus be noted that such a measuring equipment 30 is a measurement apparatus as such and is therefore distinct from a single optical fibre portion allowing, for example, to make a simple reflectometry measurement. Thus, the connection between the measuring equipment 30 and the connecting optical fibre 100 can be obtained by means of an adapted connector, which is not illustrated, the latter possibly being both a reversible connector, allowing easy connection/disconnection of the measuring equipment 30, or a permanent connector, the disconnection requiring dismantling and/or damaging the connector.

Thus, the measurement assembly 1 according to this first embodiment is intended to equip a turbomachine with the measuring equipment 30, the connecting optical fibre 100 and the measurement system 20 permanently installed in the turbomachine.

Alternatively, it is conceivable that only one part of the measurement assembly 1, namely the measuring equipment 30 and the connecting optical fibre 100 forming the measuring device 10, is permanently installed in the turbomachine, the measurement system then being connected to the connecting optical fibre 100 only in the context of maintenance operations of the turbomachine.

A connection assembly 1 according to the first embodiment of the invention more specifically comprises:
- the measuring equipment 30,
- the connecting optical fibre 100 comprising a first end 131 via which it is connected to the measuring equipment 30, and a second end 135 opposite to the first end 131,
- a coupling system 140 comprised in the second end 135 of the connecting optical fibre 100,
- the optical measurement system 20 configured to interrogate the measuring equipment by means of first optical signals in a first wavelength range $\lambda 1$, the optical measurement system 20 is connected to the second end 135 of the connecting optical fibre 100 through the coupling system 140 and is thus in communication with the measuring equipment 30 by the connecting optical fibre 100.

The measuring equipment 30 is item of measuring equipment, such as a sensor, adapted to be interrogated by means of optical signals. Thus, such a measuring equipment 30 can, for example, be an acoustic vibration sensor, a pressure sensor or a temperature sensor based on an optical measurement of the displacement of a membrane, such as the sensors marketed by Phonoptics™. For more information on such sensors, reference may be made to document US 2017/307437.

With such sensors, the interrogation of the measuring equipment 30 by the optical measurement system 20 is carried out by determining the displacement of a membrane from a reflection rate of the optical signal transmitted by the connecting optical fibre on said membrane. The displacement of this membrane being directly related to the quantity to be measured, it is possible to determine the desired quantity, such as an acoustic vibration, a pressure and a temperature.

Of course, as an alternative to such sensors, the measuring equipment 20 may be other, such as for example an active temperature or pressure sensor or else an acoustic sensor, the latter being configured to transmit the measurement signal optically to the measurement system 20 via the connecting optical fibre 100.

The measuring equipment 30 is connected to the connecting optical fibre 100.

The connecting optical fibre 100 is, as illustrated in FIG. 1, a multi-core optical fibre comprising a first optical core 111 and a second optical core 112 surrounded by an optical cladding 113.

The first optical core 111 is a multi-mode optical core in the first wavelength range $\lambda 1$ capable of transmitting optical signals in the first wavelength range $\lambda 1$, or in other words, optical signals whose wavelength is comprised in the first wavelength range.

The second optical core 112 is a single-mode optical core in a second wavelength range $\lambda 2$ capable of transmitting optical signals in the second wavelength range $\lambda 2$, or in other words, optical signals whose wavelength is comprised in the second wavelength range $\lambda 2$.

It will be noted that, preferably, the first wavelength range $\lambda 1$ is distinct from the second wavelength range $\lambda 2$, the first wavelength range $\lambda 1$ having, in a particularly advantageous manner, its minimum wavelength greater than the maximum wavelength of the second wavelength range λ2. It is this latter configuration which is implemented in the present first embodiment.

However, according to one possibility of the invention, the first wavelength range λ1 and the second wavelength range λ2 may have at least one wavelength sub-range in common or even be substantially identical.

The connecting optical fibre 100 comprises a first functionalised optical fibre portion 120 adapted, in the second wavelength range λ2, for an optical feature varying with an environmental parameter of the connecting optical fibre 100.

According to a preferred possibility of the invention, so as to allow to measure the environmental parameter of the connecting optical fibre 100, the first functionalised optical fibre portion 120 is comprised in the first end 131.

The first functionalised optical fibre portion 120 may for example include a Bragg grating 121 inscribed in the second optical core 112, said Bragg grating 121 having a resonant frequency comprised in the second wavelength range λ2. In such a configuration, the optical feature presented by the first functionalised optical fibre portion 120 in the second wavelength range λ2 and varying with an environmental parameter of the connecting optical fibre 100 is the resonance frequency of the Bragg grating 121.

Indeed, in accordance with the knowledge of the person skilled in the art, the resonance frequency of a Bragg grating inscribed in an optical fibre core varies with environmental parameters of the optical fibre, including in particular with the temperature and the stresses applied to the optical fibre. Thus according to this possibility, by measuring the resonance frequency of the Bragg grating from second optical signals in the second wavelength range λ2, it is possible to identify at least one environmental parameter of the optical fibre, for example the temperature.

As a variant of the invention not illustrated, the first functionalised optical fibre portion 120 may have a variation in the composition of the second optical core, for example by doping the core, a variation in the composition of the cladding, or else the addition of a coating at the first functionalised optical fibre portion 120 so that the first optical fibre portion has an optical feature varying with an environmental parameter of the optical fibre, such as the temperature or the presence of a specific substance. Such a feature variation can be, for example, a modification of optical index, or else a modification of fluorescence signal.

As illustrated in FIG. 1, the second end 135 of the connecting optical fibre 100 comprises the coupling system 140 on which the first optical core 111 and the second optical core 112 are split in a first optical fibre segment 136 and a second optical fibre segment 137 respectively, according to the principle of a double-clad coupler as described in document U.S. Pat. No. 8,792,757.

Such a double-clad coupler is produced by hot-assembling a double-core optical fibre with a single-core optical fibre. The optical fibre obtained during such an assembly has a double-core central part and has at each of its ends two output arms corresponding respectively to the single-core optical fibre and to the double-core optical fibre which have been assembled to one another. In addition, with such an assembly, the sizing of the output arms allows to ensure optical coupling of the first core with only the single-core output arm and optical coupling of the second core with only the double-core output arm. Within the scope of the invention, the arms corresponding respectively to the single-core optical fibre and to the double-core optical fibre were omitted at the first end 131 in order to allow connection to the measuring equipment 30.

Thus, in this way, with such a configuration, the coupling system 140 comprises a first optical fibre segment, therefore corresponding to the single-core optical fibre, optically coupled to the first optical core 111 and optically decoupled from the second optical core 112, and a second optical fibre segment 137, therefore corresponding to the double-core optical fibre, optically coupled to the second optical core 112 and optically decoupled from the first optical core 112. In this way, the first optical fibre segment 136 allows to recover all the first optical signals in the first wavelength range λ1 transmitted by the measuring equipment 30 while the second optical fibre segment 137 allows to recover the majority of the second optical signals in the second wavelength range λ2 from the first functionalised optical fibre portion 131.

Each of the first and the second optical fibre segment 136, 137 is connected to the optical measurement system 20 respectively including the first and the second optical output 141, 142 of the coupling system 140.

The optical measurement system 20 comprises:
a first measurement unit 210 configured to interrogate the measuring equipment 30 by means of first optical signals in the first wavelength range λ1, said first measurement unit 210 being connected to the first optical fibre segment 136 through the first optical output 141, and
a second measurement unit 220 being configured to measure the optical feature of the first functionalised optical fibre portion 120 by means of second optical signals in the second wavelength range λ2, said second measuring processing unit 220 being connected to the second optical fibre segment 137, through the second optical output 142.

As illustrated in FIG. 1, the first measurement unit 210 comprises:
a first optical input 231 via which the first measurement unit 210 is connected to the first optical output 141, and therefore to the first optical fibre segment 136 of the connecting optical fibre 100, said first optical input 231 being provided with a wavelength-selective optical filter for filtering the second optical signals in the second wavelength range λ2 at the input of the second measurement unit 220,
a first optical circulator 213 connecting a first optical source 211 to the first optical input 231 and the first optical input 231 to a first optical signal analyser 212 so that the optical signals from the first optical source 211 are transmitted to the connecting optical fibre 100 and the optical signals from the connecting optical fibre 100 are transmitted to the first optical signal analyser 212,
the first optical source 211 is capable of generating optical signals at the first wavelength range λ1 to interrogate the measuring equipment 30,
the first optical signal analyser 212 capable of measuring the optical signals at the first wavelength range λ1 transmitted by the measuring equipment 30.

It will be noted that the first optical circulator 213 forms a first connection element adapted to connect the first optical source 211 and the first optical signal analyser 212 at the first optical output 141 of the coupling system 140.

The optical filter is a wavelength-selective filter and adapted to attenuate at least in part the optical signals in the second wavelength range λ2 and to transmit substantially without attenuation the first optical signals in the first wavelength range λ1.

Note also that the first optical input 231 and the first optical output 141, included in the first optical fibre segment 136, are mechanically connected to each other. Such a mechanical connection can, for example, be obtained by optical welding, the use of appropriate connectors or any other type of appropriate optical connection in accordance with the general knowledge of the person skilled in the art.

According to the variant wherein only the first measuring element and the connecting optical fibre equip the apparatus to be monitored, such as a turbomachine, the connection between the connecting optical fibre 100 and the measurement system 20 only being performed in the context of maintenance operations, the mechanical connection between the first optical input 231 and the first optical output 141 is a reversible connection so as to allow connection and disconnection operations during said maintenance operations.

The first optical source 211 is an optical source capable of emitting an optical signal in the first wavelength range $\lambda 1$, either continuously or transiently, such as by the emission of light pulses. Thus, the first optical source 211 is advantageously a laser source, a tuneable laser, a light-emitting diode, also known by the acronym LED, a laser light-emitting diode, a superluminescent diode, or any light source which is capable of emitting electromagnetic radiation over a wavelength range and which is capable of being confined in an optical fibre. Thus, for example, the first optical source 211 can be an optical laser, preferably a semiconductor laser, of which at least one emission wavelength corresponds to the first wavelength range.

The first optical signal analyser 212 is configured to measure the optical signal in the first wavelength range $\lambda 1$ transmitted by the measuring equipment 30. Such a first optical signal analyser 212 can, for example, be provided by a photodiode capable of measuring the intensity of the optical signal transmitted by the measuring equipment 30. Alternatively, the first optical signal analyser 212 may be capable of measuring another feature of the optical signal transmitted by the measuring equipment, such as a frequency pulse, a fluorescence signal or a wavelength spectrum of the first optical signals, for example via a row of detectors, or else a resonance wavelength.

The optical measurement system 20 may further include a processing unit, not shown, capable of controlling the first optical source 211 and the first optical signal analyser, so as to allow to determine from the measurement of the optical signal in the first wavelength range $\lambda 1$ transmitted by the measuring equipment 30, a feature value of an environmental parameter measured by the measuring equipment 30.

As illustrated in FIG. 1, the second measurement unit 220 comprises:
- a second optical input 232 through which the second measurement unit 220 is connected to the second optical fibre segment 137 of the connecting optical fibre 100,
- a second optical circulator 223 connecting a second optical source 221 to the second optical input 232 and the second optical input 232 to a second optical signal analyser 222 so that the optical signals from the second optical source 221 are transmitted to the connecting optical fibre 100 and the optical signals from the connecting optical fibre 100 are transmitted to the second optical signal analyser 222,
- the second optical source 221 is capable of generating optical signals in the second wavelength range $\lambda 2$ in order to carry out the measurement of the optical feature of the first functionalised optical fibre portion 120,
- the second optical signal analyser 222 capable of measuring the optical signals transmitted by the fibre portion.

It will be noted that the second optical circulator 223 forms a second connection element adapted to connect the second optical source 221 and the second optical signal analyser 222 to the second optical output 142 of the coupling system 140.

The second optical input 232 and the second optical output 142, included in the second optical fibre segment 137, are mechanically connected to each other. Such a mechanical connection can, for example, be obtained by optical welding, the use of appropriate connectors or any other type of appropriate optical connection in accordance with the general knowledge of the person skilled in the art.

According to the variant wherein only the first measuring element and the connecting optical fibre equip the apparatus to be monitored, such as a turbomachine, the connection between the connecting optical fibre 100 and the measurement system 20 only being performed in the context of maintenance operations, the mechanical connection between the second optical input 232 and the second optical output 142 is a reversible connection so as to allow connection and disconnection operations during said maintenance operations.

The second optical source 211 is an optical source capable of emitting an optical signal in the second wavelength range $\lambda 1$, either continuously or transiently, such as by the emission of light pulses. Thus, the first optical source 211 is advantageously a laser source, a tuneable laser, a light-emitting diode, also known by the acronym LED, a laser light-emitting diode, a superluminescent diode, or any light source which is capable of emitting electromagnetic radiation over a wavelength range and which is capable of being confined in an optical fibre. Thus, for example, the first optical source 211 can be an optical laser, preferably a semiconductor laser, of which at least one emission wavelength corresponds to the first wavelength range.

The second optical signal analyser 212 is configured to measure the optical signal in the second wavelength range $\lambda 2$ transmitted by the first functionalised optical fibre portion 120. Such a second optical signal analyser 212 can, for example, be provided by a photodiode able to measure the intensity of the optical signal transmitted by the measuring equipment 30. Alternatively, the first optical signal analyser 212 may be able to measure another feature of the optical signal transmitted by the measuring equipment, such as a pulse frequency, a fluorescence signal or a wavelength spectrum of the first optical signals, for example via a row of detectors, or else a resonance wavelength.

In the case where the first functionalised optical fibre portion 120 comprises a Bragg grating 121, the analyser may be able to determine a resonance frequency of the Bragg grating 121 or a variation in resonance frequency of this same Bragg grating 121.

When the optical measurement system 20 includes a processing unit, the latter may also be able to control the second optical source 221 and the second optical signal analyser 222, so as to allow to determine from the measurement of the second optical signals in the second wavelength range $\lambda 2$ transmitted by the first functionalised optical fibre portion a feature value of an environmental parameter measured from the optical feature of the first functionalised optical fibre portion 120.

It may be noted that, within the context of the invention, it is perfectly possible for the processing unit to include a first and a second sub-unit dedicated respectively to the first measurement unit 210 and to the second measurement unit 220. Likewise, such a processing unit can be supplied in the form of a dedicated electronic circuit or be integrated, in the form of a program, into a computer, such as a computer on board the apparatus to be monitored.

Such a measurement assembly 100 allows to measure the parameters of an apparatus to be monitored both from the measuring equipment 30 and both from the first functionalised optical fibre portion 120.

For the remainder of this description, it should be noted that FIG. 1 illustrates by the arrow P a direction of propagation of the optical signals called upstream optical signals corresponding to the optical signals from the measurement system 20 to the measuring equipment 30. The opposite direction, corresponding to the direction from the measuring equipment 30 to the measurement system 20 is called downstream direction.

As shown in FIGS. 2A to 2E, the principle of operation of such item of measuring equipment is as follows. The first optical source 211 emits first optical signals in the first wavelength range λ1 in direction of the connecting optical fibre 100, said signal being transmitted through the first optical circulator 213 to the first optical input 231, as shown in section C-C in the upstream direction of FIG. 2E. The first optical signals in the first wavelength range λ1 is then transmitted by the first optical input 231 to the first optical output 141, and therefore to the first optical fibre segment 136, as shown in the section B-B in the upstream direction of FIG. 2C. The first optical signals in the first wavelength range λ1 are then confined in the first optical core and coexist with the second optical signals at the second wavelength λ2, emitted by the second measurement unit 220 and confined in the second optical core 112, at the double-clad coupler, as shown by section A-A in the upstream direction of FIG. 2A. The first optical signals in the first wavelength range λ1 are then transmitted to the measuring equipment 30 to allow its interrogation.

Figure 2A:
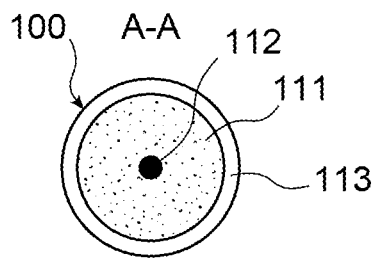
FIGS. 2A to 2G illustrate the distribution of optical signals along a connecting optical fibre and internal optical fibres of a measurement system of a measurement assembly as illustrated in FIG. 1, at section planes shown in FIG. 1, FIGS. 2A to 2G thus illustrating the respective optical signals according to a section plane A-A and a downstream direction of propagation, according to the section plane A-A and an upstream direction of propagation, according to a section plane B-B and the downstream direction, according to the section plane B-B and the upstream direction, according to a section plane C-C and the two upstream and downstream directions, according to a section plane D-D and the two upstream and downstream directions and according to a section plane E-E and the two upstream and downstream directions.
Figure 2B:
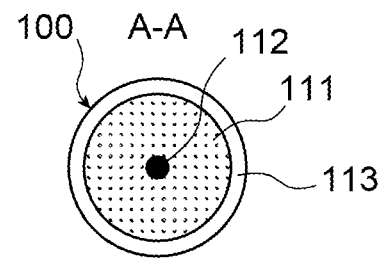
Figure 2C:
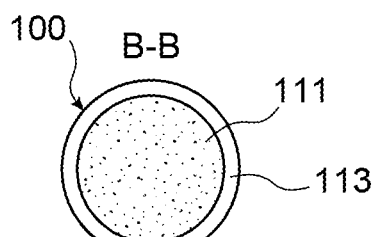
Figure 2D:
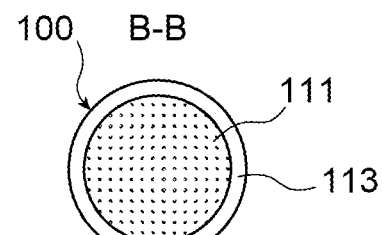
Figure 2E:
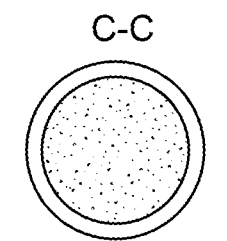
Figure 2F:
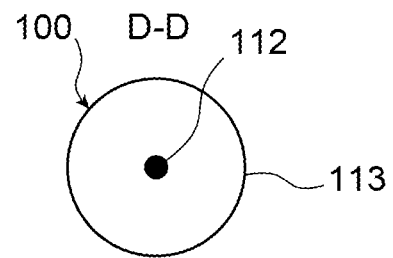

After interaction with the measuring equipment 30, the first optical signals, then called measurement signals, in the first wavelength range λ1 are transmitted by the measuring equipment 30 to the connecting optical fibre 130 as shown by the section A-A in the downstream direction of FIG. 2B. The first optical measurement signals in the first wavelength range λ1 are then transmitted with the second optical signals in the second wavelength range λ2, also called measurement wavelengths, from the first functionalised optical fibre portion 120. The double-clad coupler allows to split the first optical measurement signals in the first wavelength range λ1, transmitted only to the first optical fibre segment 136, from a majority of second optical measurement signals in the second wavelength range λ2, the majority of these second optical signals, remaining confined in the second optical core 112, being directed towards the second optical fibre segment 137, as shown in the section D-D in the downstream direction illustrated in FIG. 2F. The first measurement signals in the first wavelength range λ1 are then transmitted from the first optical fibre segment 136 to the first measurement unit 210 through the first output 141 and the optical filter 232 in order to remove the minor part of the second optical measurement signals in the second remaining wavelength range λ2, as shown in the section C-C in the downstream direction of FIG. 2E. In this way only the first optical measurement signals in the first wavelength range λ1 are transmitted to the first analyser 212 without the second optical measurement signals in the second wavelength range λ2 disturbing the analysis.

Figure 2G:
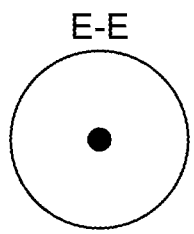

In a similar manner, the second optical source 221 emits second optical signals in the second wavelength range λ2 in direction of the connecting optical fibre 100, said signal being transmitted via the second optical circulator 223 to the second optical input 232, as shown in section E-E in the upstream direction of FIG. 2G. The second optical signals in the second wavelength range λ2 are then transmitted by the second optical input 232 to the second optical fibre segment 137, as shown in the section D-D along the upstream direction of FIG. 2F. The second optical signals in the second wavelength range λ2 are then predominantly confined in the second optical core and are transmitted in parallel to the first optical signals in the first wavelength range λ1 at the double-clad coupler, as shown by the section A-A in the upstream direction of FIG. 2A. The second optical signals in the second wavelength range λ2 are then transmitted to the first functionalised optical fibre portion 120 to allow its interrogation.

After interaction with the first optical fibre portion 120, the second optical signals, then called measurement signals, in the second wavelength range λ2 are transmitted by the first functionalised optical fibre portion 120 to the rest of the connecting optical fibre 130 as shown by section A-A in the downstream direction of FIG. 2B. The second optical measurement signals in the second wavelength range λ2 are then transmitted with the first optical measurement signals in the first wavelength range λ1 from the measuring equipment 30. The double coupler cladding then allows to split the majority of the second optical measurement signals in the second wavelength range λ2 transmitted to the second optical fibre segment 137, from the first optical measurement signals in the first wavelength λ1 which are directed only towards the first optical fibre segment 136, as shown in the section D-D in the downstream direction of FIG. 2F. The majority of the second optical measurement signals in the second wavelength range λ2 are then transmitted from the second optical fibre segment 137 to the second measurement unit 220 by means of the second optical input 232, as shown in section E-E in the downstream direction of FIG. 2G. In this way only this majority of the second optical measurement signals in the second wavelength range λ2 is transmitted to the second analyser 221 without the first optical measurement signals in the first wavelength λ1 disturbing the analysis.

It will be noted that in the context of the description of the principle of the invention above, when it is indicated that the first and second optical signals, whether they are measurement or interrogation optical signals, are transmitted together, it should be noted that this transmission "together" is performed parallel to each other. Indeed, in accordance with the principle of this first embodiment of the invention, the first optical signals in the first wavelength range λ1 are then confined in the first optical core 111 while the majority of the second optical signals in the second wavelength range is confined in the second optical core 112, the interaction between these signals is limited thereby.

Thus, with such a measurement assembly 1, as described above, it is possible to implement a measurement method comprising the following steps:

emitting first optical signals, called interrogation signals, in the first wavelength range λ1, said first optical signals being transmitted to the first optical output 141 of the coupling system 140 and the first optical core 111 in order to interrogate the measuring equipment 30, analysing the first optical signals, called measurement signals, recovered from the first optical output 141 of the coupling system 140 after interaction with the measuring equipment 30, emitting second optical signals, called interrogation signals, in the second wavelength range λ2, the second optical signals being transmitted to the second optical output 142 of the coupling system 140 and the second optical core 112 in order to interact with the first functionalised optical fibre portion 120, analysing the second optical signals, called measurement signals, recovered from the second optical output 142 of the coupling system 140 after interaction with the first functionalised optical fibre portion 120 in order to determine the optical feature of the first functionalised optical fibre portion 120 and the corresponding environmental parameter of the connecting optical fibre 100.

Figure 3:
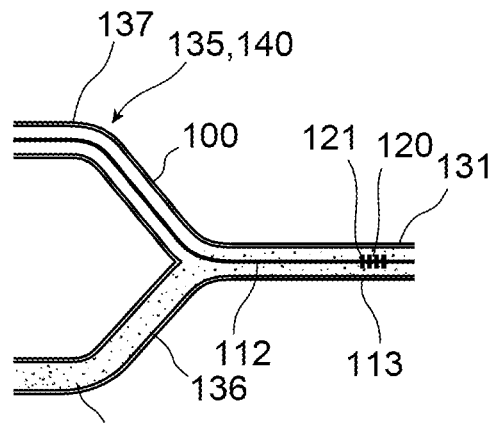
FIG. 3 illustrates an optical fibre for connecting a measurement assembly according to the first embodiment of the invention, FIGS. 4A to 4C respectively illustrate examples of the arrangement of a first and a second optical core of the optical fibre according to a section plane F-F as shown in FIG. 3.
Figure 4A:
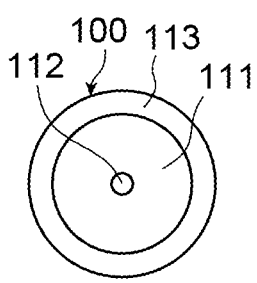
Figure 4B:
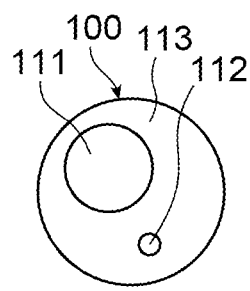
Figure 4C:
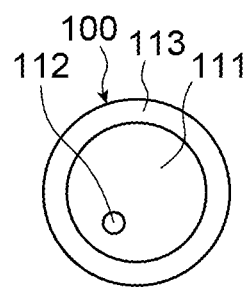

Of course, if in the present embodiment, as shown in FIGS. 1 to 2G, the connecting optical fibre is a multi-core connecting optical fibre 100 with concentric cores, other configurations are perfectly possible in the context of the invention as shown in FIGS. 3 to 4C.

Indeed, FIG. 3 illustrates a connecting optical fibre 100 according to the invention by showing a section axis F-F and FIG. 4A to 4C illustrating three examples of configurations of first and second optical cores 111, 112 that can be considered in the context of the invention. Thus, FIG. 4A shows a configuration similar to that of the first embodiment described above wherein the first and the second optical core 111, 112 are concentric, the second optical core 112 being housed in the first optical core 111. As a variant, as shown in FIG. 4B, the second optical core 112 may be eccentric relative to a centre of the connecting optical fibre 100 and disjoint. According to another variant of the invention, the second optical core 112 can be contained in the first optical core 111 in turn centred relative to the centre of the connecting optical fibre 100, the second optical core being eccentric relative to the centre of the connecting optical fibre 100.

Figure 5:
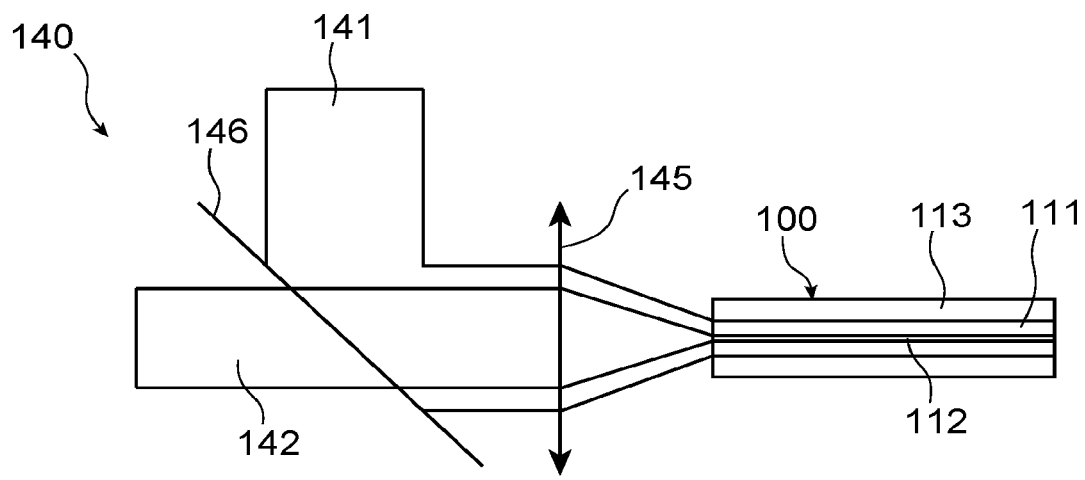
FIG. 5 illustrates an optical coupling system according to a first possibility of a variant of the first embodiment of the invention wherein an optical coupling system of the measurement assembly is external to the connecting optical fibre and for which the splitting between first and second optical signals is obtained by means of a dichroic mirror.
Figure 6:
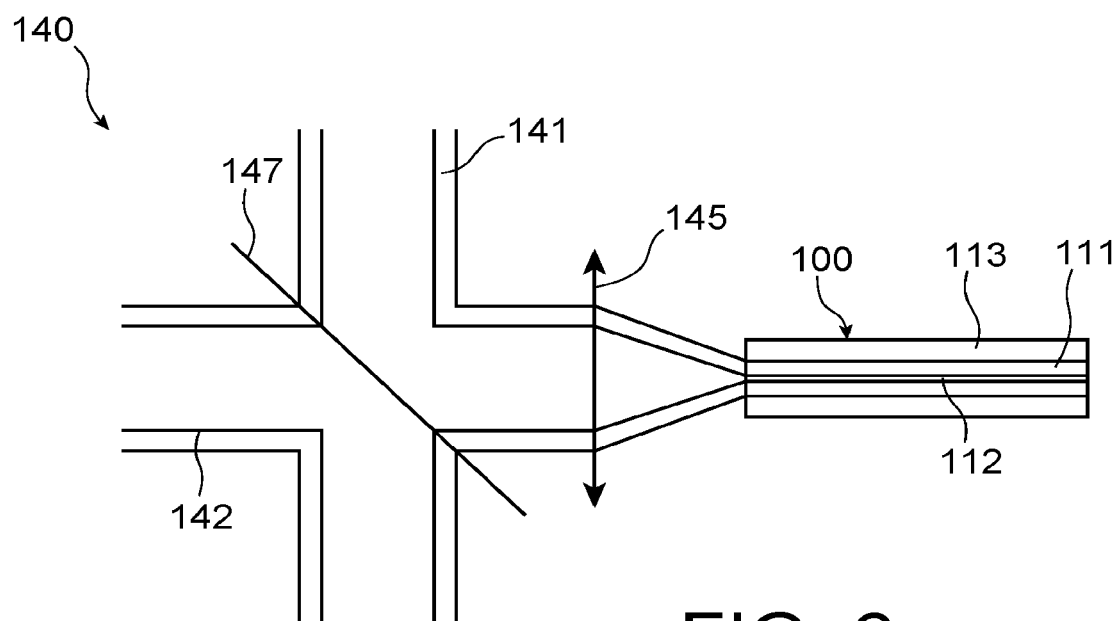
FIG. 6 illustrates an optical coupling system according to a second possibility of the variant of the first embodiment of the invention wherein the optical coupling system is external to the optical fibre and for which the coupling system is adapted to divide each of the first and second signals into a first and a second sub-beam directed respectively to a first and a second optical output of the coupling system.

As a variant of this first embodiment and according to a possibility of the invention, the coupling system can be, as illustrated in FIGS. 5 and 6, outside the connecting optical fibre 100.

Thus, according to a first possibility of this variant illustrated in FIG. 5, the coupling system 140 can be a coupler based on a splitter 146 adapted to split the first and the second optical signals on the basis of a distinctive feature between the first and the second optical signals.

In the event that the first wavelength range and the second wavelength range are distinct from each other, the splitter 146 may be based on a dichroic optical component, such as a dichroic mirror or a dichroic filter.

In the event that the first wavelength range and the second wavelength range present are at least partially merged, the splitter 146 may be based on another distinguishing feature of the first wavelength range and the second wavelength range, such as a polarisation or a beam dimension. Thus, for example, in the case where said polarisation feature, such a splitter 146 can be a polarisation beam splitter.

FIG. 5 illustrates a practical example of a coupling system 140 according to this possibility wherein the first wavelength range and the second wavelength range are distinct from each other and wherein the splitter 146 is a dichroic mirror configured to reflect optical signals in the first wavelength range λ1 and configured to transmit optical signals in the second wavelength range λ2.

In this practical example, the splitter is placed at 45° from the optical axis of the connecting optical fibre 100, in this way, the first optical measurement signals are reflected at 90° from the optical axis of the connecting optical fibre in the top direction of the figure to the first optical output 141 and the second optical measurement signals are transmitted without modification of its direction of propagation to the second optical output 142.

It will be noted that, in the present practical example, the coupling system 140 is preferably adapted to allow good injection of the first optical signals, emitted by the first optical source 211, into the first optical core 111 and the second optical signals, emitted by the second optical source 221, in the second optical core 112. Such an adaptation can be obtained by a double optimisation, that of the distinct configuration, in particular as regards the dimensioning of the beam and its state of focusing, between the first optical signals and the configuration of the injection optics 145, here a converging lens, used for the injection of the first and second optical signals into the connecting optical fibre.

It will further be noted that such an adaptation can also come from the configuration of the connecting optical fibre 100 of which, according to one possibility of the invention, the second optical core 112 may not be adapted to guide the optical signals in the first wavelength range λ1.

According to a second possibility of this variant, the coupling system 140 can be based on a beam splitter 147 adapted to divide each of the first and second signals into a first and a second sub-beam directed respectively towards the first and the second optical output 141, 142 of the coupling system 140. According to this second possibility, the beam splitter 147 can in particular be provided with a semi-reflecting mirror also known as "beam splitter".

FIG. 6 illustrates a practical example of a coupling system 140 according to this second possibility wherein the beam splitter 147 is a semi-reflecting mirror. As shown in FIG. 6, such a coupling system has a sensitive configuration identical to that of the coupling system according to the first possibility with a substitution of the splitter 146 by the beam splitter 147.

Figure 7:
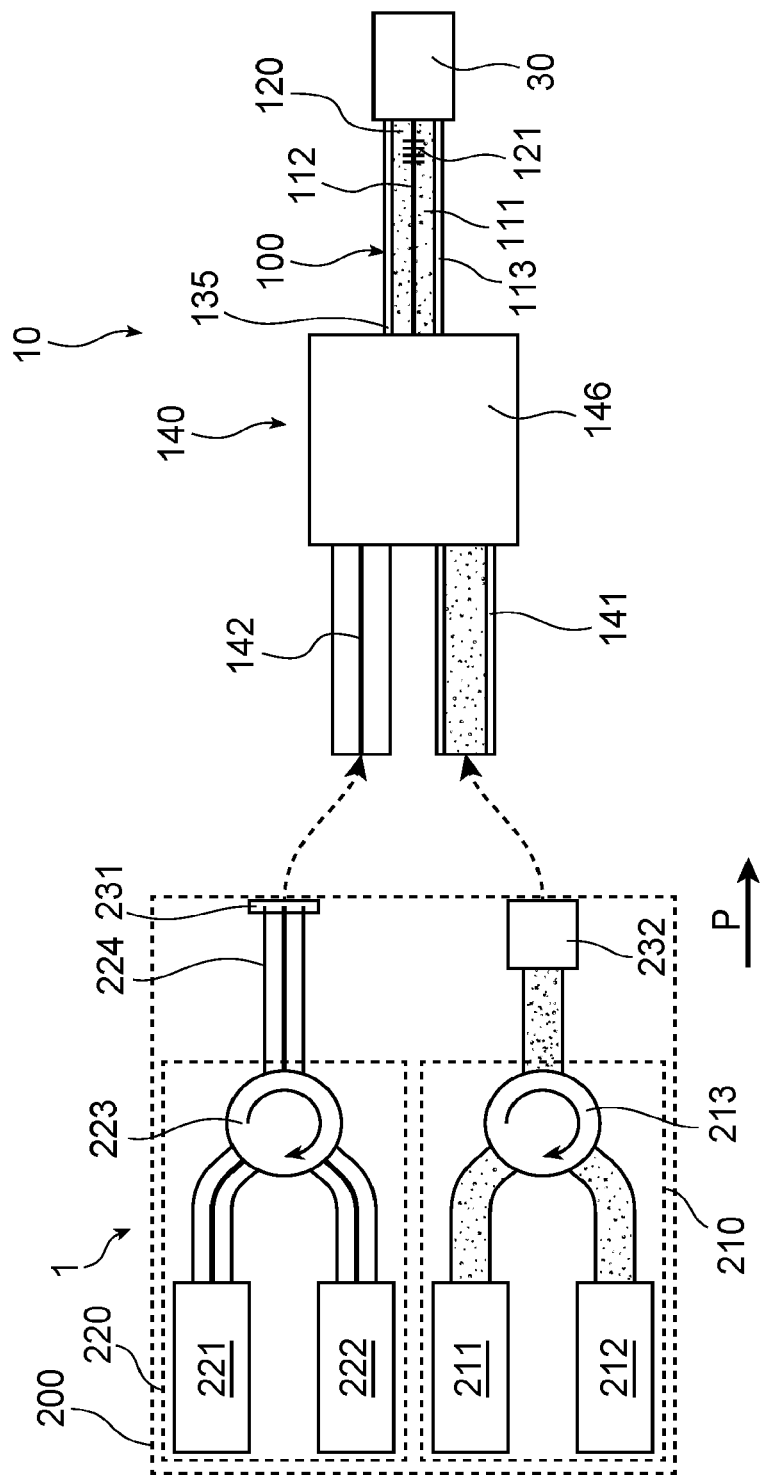
FIG. 7 illustrates a measurement assembly according to the variant of the invention of this first embodiment of the invention wherein the optical coupling system is according to the possibility of the invention illustrated in FIG. 5.

FIG. 7 illustrates a measurement assembly 1 according to this variant of the invention wherein the coupling system 140 is external to the connecting optical fibre 100, according to the first possibility wherein the coupler comprises a splitter 146 to split the first optical signals from the second optical signals. As illustrated in FIG. 7 and in order to facilitate the connection of the coupling system with the measurement system 20, the first optical signals are injected, after splitting, into a first optical fibre section including a multi-mode optical core in the first wavelength range. Likewise, the second optical signals are injected, after splitting, into a second optical fibre section including a single-mode optical core in the second wavelength range. According to such a variant, in addition to the features related to the coupling system 140 itself, the fact that the connecting optical fibre 100 does not include at its second end 135 the coupling system 140 and the fact that the connecting optical fibre 100 is therefore connected to the coupling system 140 by its second end 135, the measurement assembly 1 has a configuration similar to that described in the context of the first embodiment.

Figure 8:
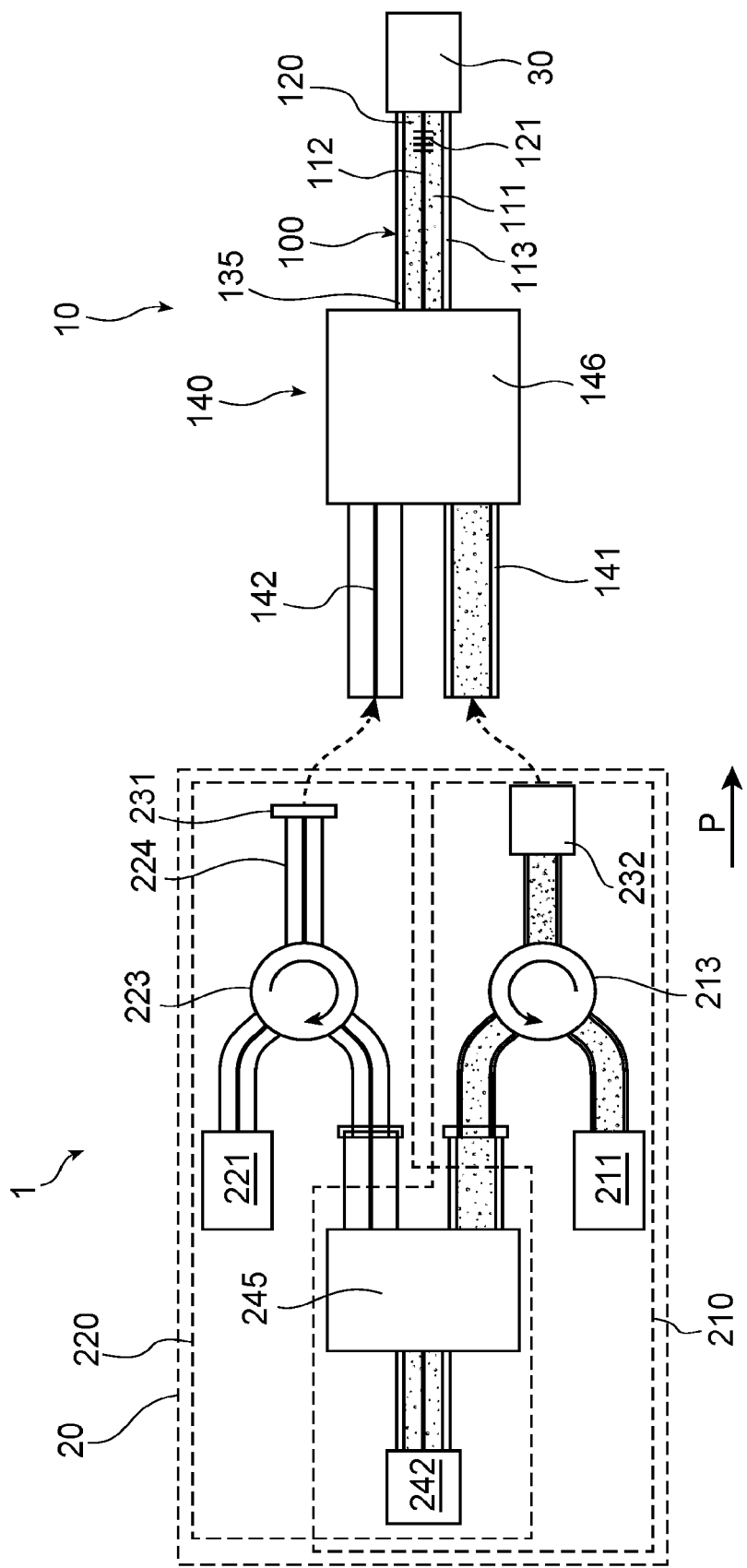
FIG. 8 illustrates a measurement assembly according to a second embodiment wherein a measurement system of the invention of the measurement assembly comprises a single optical signal analyser for analysing the first and second optical signals.

FIG. 8 illustrates a measurement assembly according to a second embodiment according to the variant of the invention illustrated in FIG. 7 and wherein provision is made of a single optical signal analyser 242 instead of the first and second optical signal analyser 212, 222.

Thus, a measurement assembly according to this second embodiment differs from a measurement assembly according to the variant of the first embodiment illustrated in FIG. 7 in that it includes a single optical signal analyser 242 instead of the first and second optical signal analyser 212, 222, and in that the measurement assembly further includes a second coupling system 245 adapted to couple the first and second measurement signals at an input optical fibre of the single optical signal analyser 242.

In this second embodiment, the single spectrum analyser is adapted to analyse the first optical signals resulting from the interrogation of the measuring equipment 30 and to analyse the second optical signals after interaction with the first functionalised optical fibre portion 120 in order to determine the optical feature of the first functionalised optical fibre portion 120 and the environmental parameter of the corresponding connecting optical fibre 100.

In this second embodiment, the first optical circulator 213 connects the first optical source 211 to the first optical input 231 and the first optical input 231 to the second coupling system 245 so that the first optical interrogation signals from the first optical source 211 are transmitted to the connecting optical fibre 100 and that the first optical measurement signals from the connecting optical fibre 100 are transmitted to the single optical signal analyser 242 through the second coupling system 245. Thus, the second coupling system 245 and the first optical circulator 213 together form a first connection element adapted to connect the first optical source 211 and the single optical signal analyser 242 to the first output of the coupling system 140.

Likewise, the second optical circulator 223 connects the second optical source 221 to the second optical input 232 and the second optical input 232 to the second coupling system 245 so that the second optical interrogation signals from the second optical source 221 are transmitted to the connecting optical fibre 100 and the second optical measurement signals from the connecting optical fibre 100 are transmitted to the single optical signal analyser 242 through the second coupling system 245. Thus, the second coupling system 245 and the second optical circulator 223 together form a second connection element adapted to connect the second optical source 212 and the single optical signal analyser 242 to the first output of the coupling system 140.

The measurement assembly 1 according to the second embodiment has an operating principle similar to that of the measurement assembly 1 according to the first embodiment, with the difference that the analysis of the first and second optical signals is implemented by the unique optical signal analyser. Thus, according to the same possibility as that of the measurement assembly 1 according to the first embodiment, the interrogation of the measuring equipment 30 and that of the first functionalised optical fibre portion can be carried out in parallel or sequentially.

Figure 9:
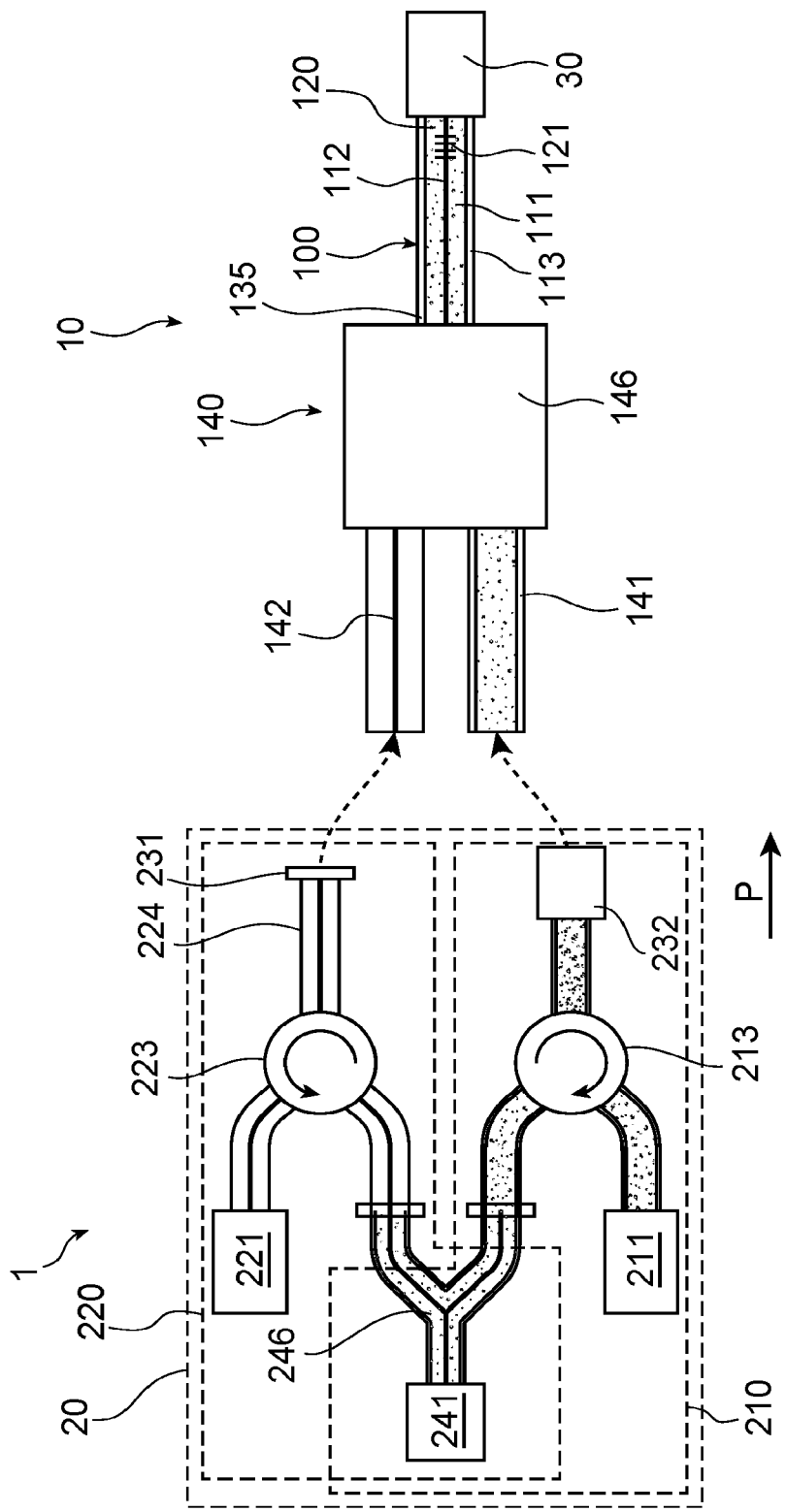
FIG. 9 illustrates a measurement assembly according to a third embodiment wherein the measurement system comprises a single optical source for emitting the first and the second optical signals.

FIG. 9 illustrates a measurement assembly according to a third embodiment according to the variant of the invention illustrated in FIG. 7 and wherein provision is made of a single optical source 241 instead of the first and second optical sources 211, 221.

Thus, a measurement assembly according to this third embodiment differs from a measurement assembly according to the variant of the first embodiment illustrated in FIG. 7 in that it includes a single optical source 241 instead of the first and second optical source 212, 222, said single source being adapted to emit both in the first and the second wavelength range λ1, λ2 and in that the measurement assembly further includes a beam splitting system 236 to transmit the optical signals emitted by the single source as first optical interrogation signals to the first optical input 231, and therefore the first optical output 142, and, as second optical interrogation signals to the second optical input 232.

In such a third embodiment, according to a first possibility of the invention and with a first and a second adapted wavelength range, the beam splitting system 236 can be adapted to transmit to the first optical circulator 213 the part of the emitted radiation corresponding to the first wavelength range, this first part then corresponding to the first optical interrogation signals, and to transmit to the second optical circulator 223 the part of the emitted radiation corresponding to the second wavelength range, this second part then corresponding to the second optical interrogation signals. Thus, such a possibility can in particular be implemented by means of a double-core optical fibre with a second single-mode core adapted to guide only optical signals in the second wavelength range. According to this same possibility, it is possible to provide dichroic filters at the splitter to split the first optical interrogation signals from the second optical interrogation signals.

It can be noted that, according to the above possibility, in the case where the single optical source 241 is a wavelength tuneable optical source, the emission of the first and second optical signals will be necessary sequentially, since the optical source cannot in such a configuration simultaneously emit in the first and second wavelength ranges if the latter are separate. On the other hand, for an optical source 241 which is a broadband emission source, if the latter is adapted, such a configuration allows parallel emission of the first and second optical interrogation signals.

According to another possibility, wherein the first and second wavelength ranges are at least partially merged, the electromagnetic radiation emitted by the single optical source 241 can be split into two substantially identical optical signals, the first optical signals, transmitted to the first circulator 213, and the second optical signals transmitted to the second optical circulator 223. According to this possibility, the emission of the first and second signals is necessarily carried out in parallel.

The measurement assembly 1 according to the third embodiment has an operating principle similar to that of the measurement assembly 1 according to the first embodiment, with the difference that the emission of the first and second optical interrogation signals is carried out by the single optical source 241. Thus, according to the same possibility as that of the measurement assembly 1 according to the first embodiment, the interrogation of the measuring equipment 30 and that of the first functionalised optical fibre portion, depending on the configuration of the single optical source 241 and the beam splitting system 236, can be performed in parallel or sequentially.

Figure 10:
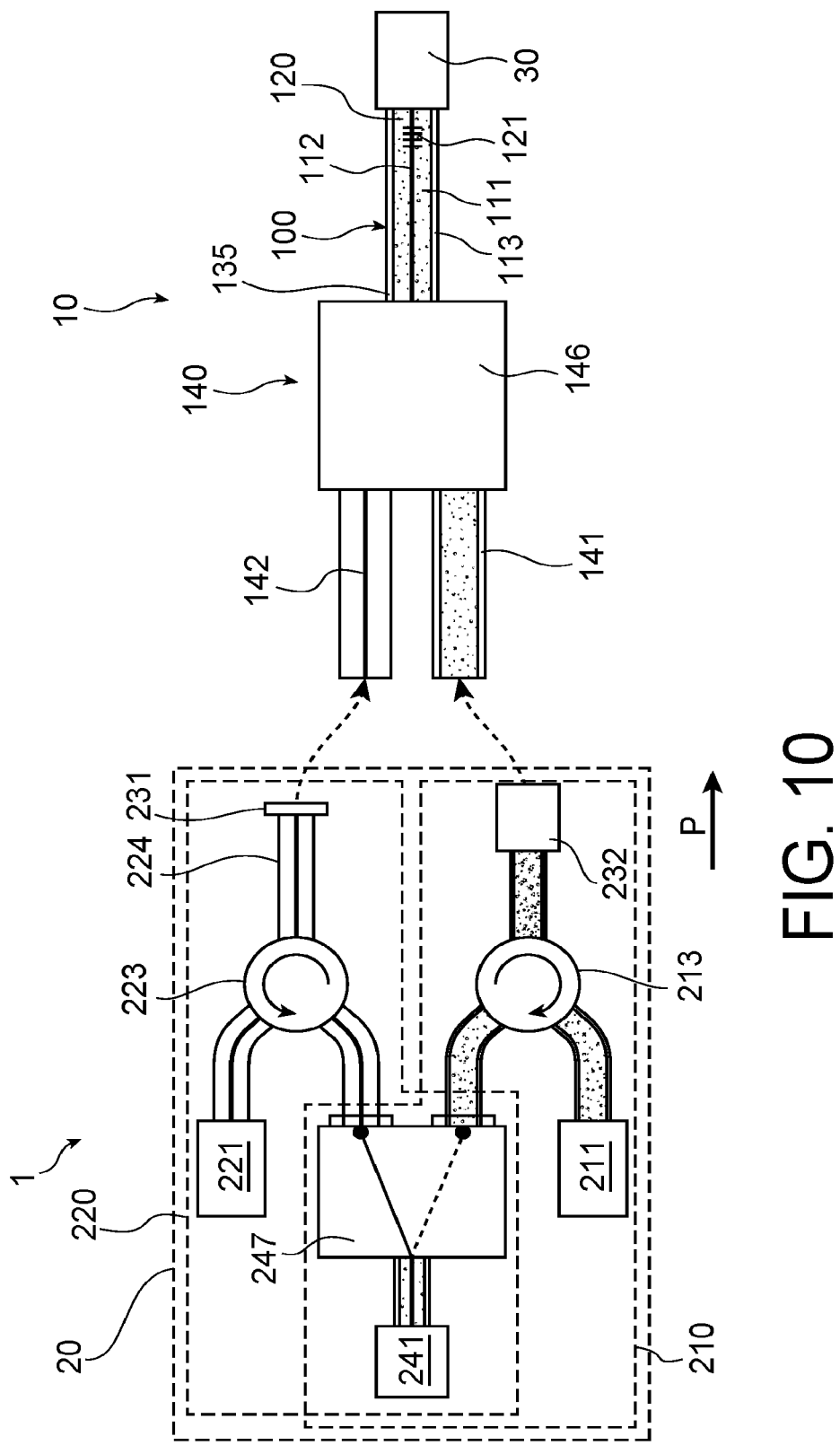
FIG. 10 illustrates a measurement assembly according to a variant of the third embodiment wherein an optical switch is provided for transmitting the first and second optical signals emitted by the optical source respectively to the first and the second optical output of the coupling system.

FIG. 10 illustrates a measurement assembly according to a variant of the third embodiment of the invention wherein instead of a beam splitter 246 provision is made of an optical switch 247, capable of switching the optical signals emitted by the single optical source 241 between respectively the first optical circulator 213, to act as first optical interrogation signals, and the second optical circulator 223, to act as second optical interrogation signals.

According to such a variant, the electromagnetic radiation emitted by the single optical source is transmitted successively to the first and to the second optical circulator 213, 223.

Thus, if the measurement assembly 1 according to the third embodiment has an operating principle similar to that of the measurement assembly 1 according to the third embodiment, the interrogation of the measuring equipment 30 and that of the first functionalised optical fibre portion can only be performed sequentially by the successive transmission of the electromagnetic radiation emitted by the single optical source to the first and to the second optical circulator 213, 223.

Figure 11:
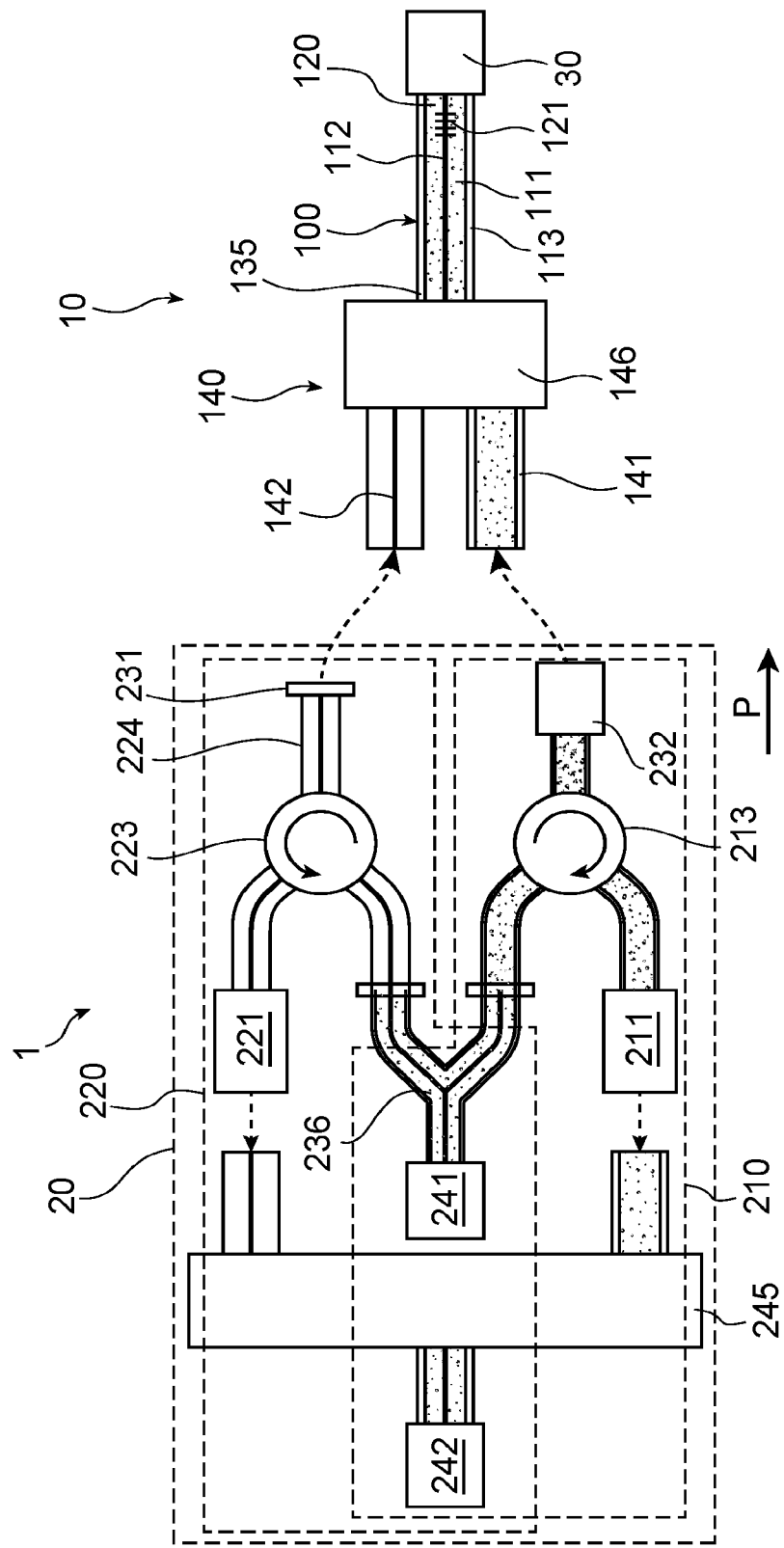
FIG. 11 illustrates a measurement assembly according to a fourth embodiment wherein the measurement system comprises a single optical source for emitting the first and second optical signals and a single optical signal analyser for analysing the first and second optical signals.

FIG. 11 illustrates a measurement assembly according to a fourth embodiment corresponding to a measurement assembly according to the second embodiment wherein, in accordance with the third embodiment, a single optical source 241 is provided instead of the first and second optical sources 211, 221.

Such a measurement assembly combines the distinctive features of the measuring assemblies of the second and third embodiments relative to the first embodiment. Thus, the operating principle of such a measurement assembly therefore has the same considerations as those of a measurement assembly according to a third embodiment. In this fourth embodiment, the transmission of the first and second optical interrogation signals is therefore carried out by the single optical source 241. According to the same possibility as that of the measurement unit 1 according to the first embodiment, the interrogation of the measuring equipment 30 and that of the first functionalised optical fibre portion, depending on the configuration of the single optical source 241 and of the beam splitting system 236, can be performed in parallel or sequentially.

Figure 12:
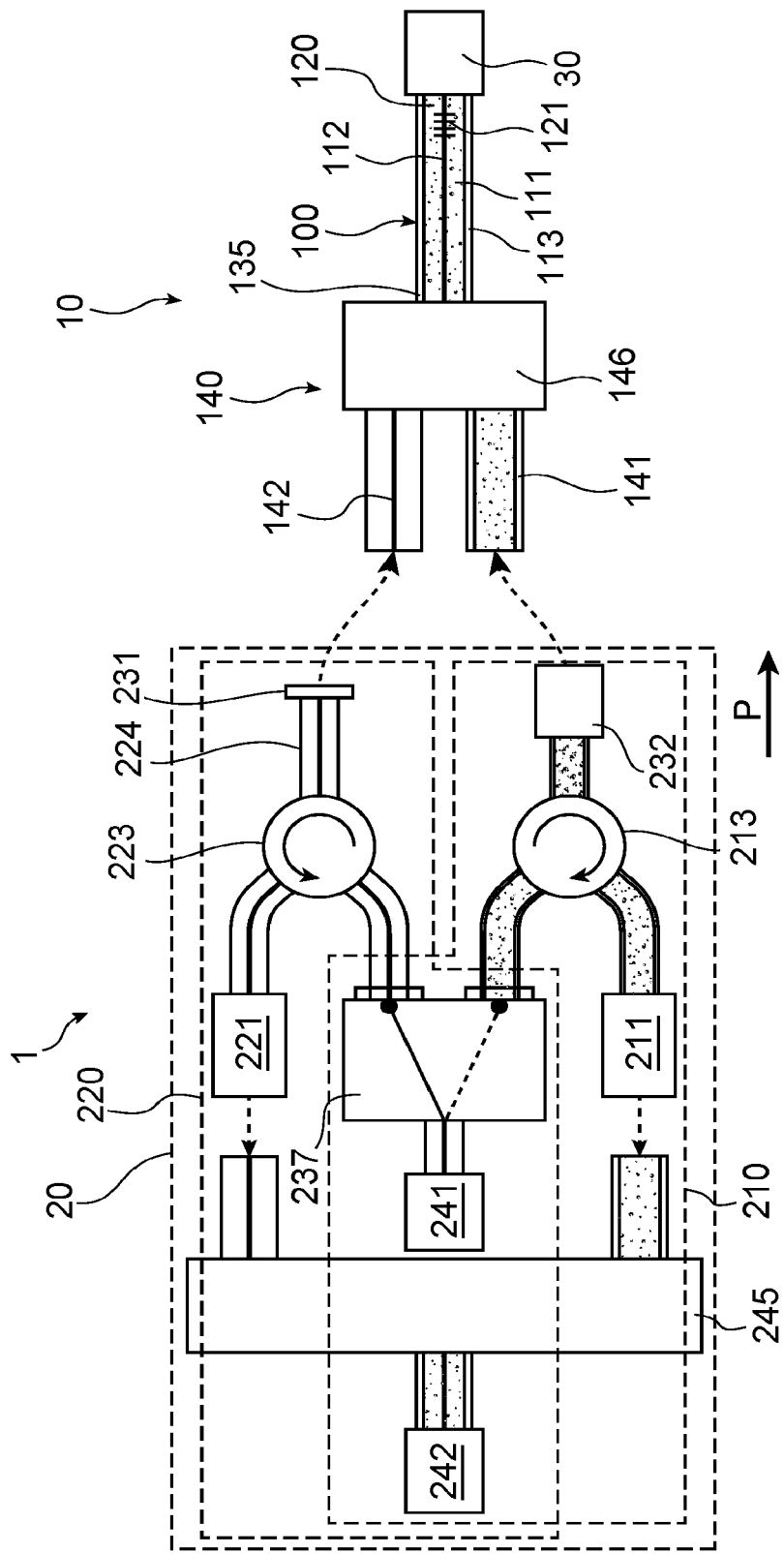
FIG. 12 illustrates a measurement assembly according to a variant of the fourth embodiment wherein an optical switch is provided for transmitting the first and second optical signals emitted by the optical source respectively to the first and the second optical output of the coupling system.

FIG. 12 illustrates a measurement assembly according to a variant of the fourth embodiment of the invention wherein instead of a beam splitter 246 provision is made of an optical switch 247, capable of switching the optical signals emitted by the single optical source 241 between respectively the first optical circulator 213, to act as first optical interrogation signals, and the second optical circulator 223, to act as second optical interrogation signals.

Such a measurement assembly combines the distinctive features of the measuring assemblies of the second embodiment and of the variant to the third embodiment relative to the first embodiment. Thus, the operating principle of such a measurement assembly therefore has the same considerations as those of a measurement assembly according to the variant to the third embodiment. According to this variant to the fourth embodiment, the interrogation of the measuring equipment 30 and that of the first functionalised optical fibre portion are therefore carried out sequentially by the successive transmission of the electromagnetic radiation emitted by the single optical source to the first and to the second optical circulator 213, 223.

The invention claimed is:

1. A measuring device comprising,
   a measuring equipment configured to be interrogated optically by a measurement system with first optical signals in a first wavelength range,
   a connecting optical fibre comprising a first end connected to the measuring equipment and a second end intended to be connected to the measurement system, the connecting optical fibre comprising
      a first multi-mode optical core in the first wavelength range for transmitting the first optical signals,
      a second single-mode optical core in a second wavelength range for transmitting second optical signals, and
      a first functionalised optical fibre portion adapted to have at the second wavelength range an optical feature varying with an environmental parameter of the connecting optical fibre, and
   a coupling system associated with the second end of the connecting optical fibre, the coupling system comprising at least a first optical output and a second optical output and being adapted to optically couple the first multi-mode optical core with the first optical output and to optically couple the second single-mode optical core with the second optical output.

2. The measuring device according to claim 1, wherein the coupling system is further configured, at the first optical output, to at least partially filter the second optical signals guided through the first multi-mode optical core.

3. The measuring device according to claim 1, wherein the second end of the connecting optical fibre comprises the coupling system,
   the coupling system comprising a first optical fibre segment optically coupled to the first multi-mode optical core and optically decoupled from the second single-mode optical core, and a second optical fibre segment optically coupled to the second single-mode optical core and optically decoupled from the first multi-mode optical core,
   the first optical fibre segment comprising the first optical output,
   the second optical fibre segment comprising the second optical output,
   the coupling system being a double-clad coupler.

4. The measuring device according to claim 1, wherein the coupling system is a splitter external to the connecting optical fibre, the splitter being capable of splitting the first optical signals and the second optical signals to direct the first optical signals and the second optical signals respectively to the first optical output and the second optical output.

5. The measuring device according to claim 1, wherein the first functionalised optical fibre portion comprises a Bragg grating inscribed in the second single-mode optical core.

6. The measuring device according to claim 1, wherein the measuring equipment is a vibration detection system.

7. The measuring device according to claim 6, wherein the measuring equipment is a membrane vibration detection system.

8. A measuring assembly comprising:
   a measuring device according to claim 1,
   an optical measurement system configured to interrogate the measuring equipment with the first optical signals in the first wavelength range and to measure the optical feature of the first functionalised optical fibre portion functionalised with the second optical signals in the second wavelength range, the optical measurement system being connected to the first optical output of the coupling system and to the second optical output of the coupling system.

9. The measuring assembly according to claim 8, wherein the optical measurement system comprises:
   a first optical source adapted to emit optical signals in the first wavelength range,
   a first optical signal analyser adapted to analyse the first optical signals from the interrogation of the measuring equipment,
   a second optical source adapted to emit optical signals in the second wavelength range,
   a second optical signal analyser adapted to analyse the second optical signals in order to determine the optical feature of the first functionalised optical fibre portion,
   a first connection element adapted to connect the first optical source and the first optical signal analyser to the first optical output of the coupling system,
   a second connection element adapted to connect the second optical source and the second optical signal analyser to the second optical output of the coupling system.

10. The measuring assembly according to claim 8, wherein the optical measurement system comprises:

a first optical source adapted to emit optical signals in the first wavelength range, a second optical source adapted to emit optical signals in the second wavelength range, an optical signal analyser adapted to analyse the first optical signals resulting from the interrogation of the measuring equipment and to analyse the second optical signals after interaction with the first functionalised optical fibre portion in order to determine the optical feature of the first functionalised optical fibre portion and the environmental parameter of the connecting optical fibre, a first connection element adapted to connect the first optical source and the optical signal analyser to the first optical output of the coupling system, a second connection element adapted to connect the second optical source and the optical signal analyser to the second optical output of the coupling system.

11. The measuring assembly according to claim 8, wherein the optical measurement system comprises:

an optical source adapted to emit optical signals in the first wavelength range and optical signals in the second wavelength range, a first optical signal analyser adapted to analyse the first optical signals from the interrogation of the measuring equipment, a second optical signal analyser adapted to analyse the second optical signals after interaction with the first functionalised optical fibre portion in order to determine the optical feature of the first functionalised optical fibre portion and the environmental parameter of the connecting optical fibre, a first connection element adapted to connect the optical source and the first optical signal analyser to the first optical output of the coupling system, a second connection element adapted to connect the optical source and the second optical signal analyser to the second optical output of the coupling system.

12. The measuring assembly according to claim 8, wherein the optical measurement system comprises:

an optical source adapted to emit optical signals in the first wavelength range and in the second wavelength range, an optical signal analyser adapted to analyse the first optical signals resulting from the interrogation of the measuring equipment and to analyse the second optical signals after interaction with the first functionalised optical fibre portion in order to determine the optical feature of the first functionalised optical fibre portion and the environmental parameter of the connecting optical fibre, a first connection element adapted to connect the optical source and the first optical signal analyser to the first optical output of the coupling system, a second connection element adapted to connect the optical source and the second optical signal analyser to the second optical output of the coupling system.

13. The measuring assembly according to claim 8, wherein the measuring device is a measuring device, and wherein the optical measurement system is configured to measure a change in a resonant frequency of a Bragg grating from optical signals in the second wavelength range.

14. An apparatus comprising a measurement assembly according to claim 8.

15. The apparatus according to claim 14, wherein said apparatus is a turbomachine.

16. A measurement method from a measuring device according to claim 1, comprising the following steps:

emitting first optical signals in the first wavelength range, said first optical signals being transmitted to the first optical output of the coupling system and the first multi-mode optical core in order to interrogate the measuring equipment, analysing the first optical signals recovered from the first optical output of the coupling system after interaction with the measuring equipment, emitting second optical signals in the second wavelength range, the second optical signals being transmitted to the second optical output of the coupling system and the second single-mode optical core in order to interact with the first functionalised optical fibre portion, analysing the second optical signals recovered from the second optical output of the coupling system after interaction with the first functionalised optical fibre portion in order to determine the optical feature of the first functionalised optical fibre portion and the environmental parameter of the connecting optical fibre.

* * * * *